US006535660B1

(12) United States Patent
Judy

(10) Patent No.: US 6,535,660 B1
(45) Date of Patent: Mar. 18, 2003

(54) RAMAN-AMPLIFIED OPTICAL TRANSMISSION SYSTEM

(75) Inventor: Arthur F Judy, Atlanta, GA (US)

(73) Assignee: Lucent Technologies Inc., Murray Hill, NJ (US)

(*) Notice: Subject to any disclaimer, the term of this patent is extended or adjusted under 35 U.S.C. 154(b) by 205 days.

(21) Appl. No.: 09/634,966

(22) Filed: Aug. 9, 2000

(51) Int. Cl.$^7$ ................................................. G02B 6/42
(52) U.S. Cl. ............................... 385/15; 385/24; 372/6
(58) Field of Search ......................... 385/24, 15; 372/6

(56) References Cited

U.S. PATENT DOCUMENTS

| | | | |
|---|---|---|---|
| 4,844,575 A | 7/1989 | Kinard et al. | 350/96.23 |
| 4,900,126 A | 2/1990 | Jackson et al. | 350/46.23 |
| 4,913,507 A | 4/1990 | Stamnitz et al. | 350/96.15 |
| 5,039,199 A | 8/1991 | Mollenauer et al. | 359/334 |
| 5,191,631 A | 3/1993 | Rosenberg | 385/123 |
| 5,323,404 A | 6/1994 | Grubb | 372/6 |
| 5,611,016 A | 3/1997 | Fangmann et al. | 385/100 |
| 5,887,093 A * | 3/1999 | Hansen et al. | 359/160 |
| 6,081,366 A | 6/2000 | Kidorf et al. | 359/341 |

FOREIGN PATENT DOCUMENTS

WO    WO 99/57822    11/1999    ........... H04B/10/18

OTHER PUBLICATIONS

Mochizuki, "Optical Fiber Transmission Systems Using Stimulated Raman Scattering: Theory", Journal of Lightwave Technology, vol. LT–3, No. 3, Jun. 1985, pp. 688–694.

"Measurement of the effective area of single–mode optical fiber", Fiber Optic Test Procedure (FOTP)–132, Feb. 10, 2000, pp 1–42.

Mollenauer, et al., "Soliton Propagation In Long Fibers With Periodically Compensted Loss", IEEE Journal of Quantum Electronics, vol, QE–22, No. 1, Jan. 1986, pp. 157–173.

* cited by examiner

*Primary Examiner*—Hung N. Ngo
(74) *Attorney, Agent, or Firm*—Barry H. Freedman

(57) ABSTRACT

A Raman-amplified optical transmission system 80 includes a source of optical transmission signals having a system wavelength, $\lambda_s$, that are connected to one end of the of a first optical fiber 50-1 having a large effective area, i.e., $A_{eff} \geq 70$ $\mu m^2$. The other end of the first optical fiber is connected to a second optical fiber 50-2 having a small effective area, i.e., $A_{eff} \leq 60$ $\mu m^2$. Preferably, the first and second optical fibers have opposite dispersion signs. A wavelength-division multiplexer 87, for example, couples optical transmission signals $\lambda_1 \ldots \lambda_n$, from an optical pump 88 to the second optical fiber that cause it to exhibit stimulated Raman scattering, which provides amplification of the optical transmission signals. Preferably, the optical pump signals propagate along the second optical fiber in a direction that is opposite the direction of the optical transmission signals. Exemplary cables 500, 600 are disclosed that include both large and small-effective-area fibers. One cable 600 is defined by a planar array of optical fibers that are bound together by a matrix material 65 in what is referred to as a ribbon, and another cable 500 is defined by fibers that are enclosed within one or more plastic tubes 52.

17 Claims, 4 Drawing Sheets

RAMAN-AMPLIFIED OPTICAL TRANSMISSION SYSTEM

CROSS REFERENCE TO RELATED APPLICATIONS

This patent application is related to application Ser. No. 09/635,313 of Arthur F. Judy, filed concurrently herewith.

TECHNICAL FIELD

This invention relates to the field of information transmission using optical fibers, and more particularly to the design of an optical transmission system that employs stimulated Raman scattering for amplification.

BACKGROUND OF THE INVENTION

The growth in optical communications has been fueled by the extraordinary bandwidth that is available on optical fiber. Such bandwidth enables thousands of telephone conversations and television channels to be transmitted simultaneously over a hair-thin fiber that is made from a high-quality glass material. Nevertheless, similar to electrical signals, optical signals experience loss during transmission and must be periodically amplified, although the need for amplification is reduced by increasing the power of the optical signals to be transmitted. To handle increased optical power, fibers having larger effective areas have been developed in order to avoid the nonlinear effects associated with high power density.

Optical amplification is more cost effective than the conversion of optical signals into electrical signals, which are amplified and then converted back into optical signals. One amplification technique involves: doping a length of optical fiber with rare earth materials such as erbium or praseodymium; pumping optical energy into the length of optical fiber at a wavelength that is different than the wavelength of the optical signal to be amplified; and propagating the optical signal along the length of rare-earth-doped fiber to extract energy at its own wavelength. Erbium-doped fiber is used to amplify optical signals having wavelengths in the 1550 nanometer (nm) region where there is a transition in the $Er^{3+}$ dopant ion, whereas praseodymium is useful in the 1310 nm region. Although such amplifiers represent a significant improvement over the above-described electronic amplification method, the price of such optical amplifiers is still high—e.g., $25,000 to $50,000 each. In addition, erbium amplifiers have to be driven by one or two laser-diode pumps; and, if a pump quits, the whole system goes down. (The erbium is not transparently turned off, but it uses a prelevel laser that absorbs the signal when it goes off.) Praseodymium amplifiers have some of the same problems and, in addition, are made of a fluoride-base fiber that is brittle and fragile.

Another optical amplification technique takes advantage of a phenomenon known as stimulated Raman scattering (SRS), which has substantial benefits including: low cost— e.g., $3000 to $4000 each; operation at all wavelengths; and use of the transmission fiber itself for amplification. Indeed, this technique relies on an intrinsic property of the material of the fiber and does not require the presence of any special dopant in the fiber such as erbium. Accordingly, it is frequently desirable to use Raman amplification in optical transmission systems.

Raman amplification involves the introduction of an optical pump signal onto the transmission fiber, and for a given pump power Raman amplification efficiency increases as optical power density increases. However, if the power density of the fiber becomes too great, then optical transmission signals experience undesirable nonlinear effects. Accordingly, it is desirable to reconcile the need for low power density, which reduces nonlinear effects, with the need for high power density, which increases Raman amplifier efficiency, in an optical transmission system.

SUMMARY OF THE INVENTION

In accordance with the present invention, a Raman-amplified optical transmission system includes a source of optical transmission signals that is connected to one end of a first optical fiber having an effective area. The other end of this fiber is connected to a second optical fiber having a substantially smaller effective area. Optical pump signals are coupled to the second optical fiber that cause it to exhibit stimulated Raman scattering and, hence, amplification of the optical transmission signals.

In an illustrative embodiment of the present invention, the optical pump signals propagate along the second optical fiber in a direction that is opposite the direction of the optical transmission signals.

Various cable configurations are useful in connection with the present invention that preferably include an equal number of large-effective-area fibers, i.e., $A_{eff} \geq 70\ \mu m^2$, and small-effective-area fibers, i.e., $A_{eff} \leq 60\ \mu m^2$ within the same cable. One of the cable configurations includes a planar array of optical fibers that are bound together in a matrix material; whereas in another configuration, groups of optical fibers are enclosed within one or more plastic tubes.

BRIEF DESCRIPTION OF THE DRAWING

The invention and its mode of operation will be more clearly understood from the following detailed description when read with the appended drawing in which.

TERMINOLOGY

Figure 1:
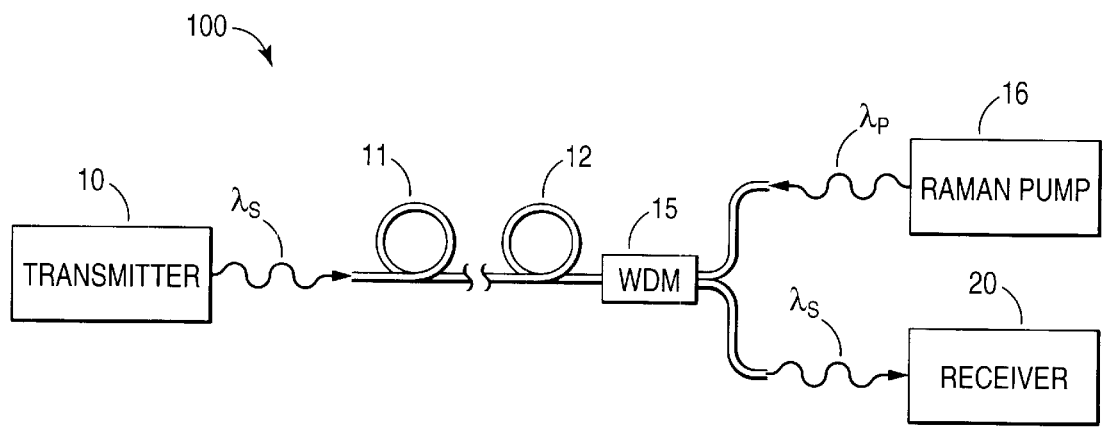
FIG. 1 is a schematic representation of an optical transmission system using reverse-pumped Raman amplification.

The following definitions are in accord with common usage in the art:

Effective Area ($A_{eff}$)—an optical attribute that is specified for singlemode optical fibers and defined as:

$$A_{eff} = 2\pi \left( \int_0^\infty E^2 r\, dr \right)^2 \bigg/ \left( \int_0^\infty E^4 r\, dr \right),$$

where E is the electric field associated with the propagated light. As a practical matter, effective area is related to the mode field diameter of the fiber according to the mapping function:

$$A_{eff} = k\pi \left( \frac{MFD}{2} \right)^2,$$

where k is a fitting coefficient.

Mode Field Diameter (MFD)—a measure of the width of the guided optical power's intensity in a singlemode fiber. For most singlemode fibers, the shape of the intensity versus radial position typically follows the familiar Gaussian or bell-shaped curve. The radius at which the intensity drops to $1/e^2 = 0.135$ the peak value is called the mode field radius, which is multiplied by two to give the MFD.

Large Effective Area—for the purpose of the present invention, an optical fiber wherein $A_{eff} \geq 70\ \mu m^2$.

Small Effective Area—for the purpose of the present invention, an optical fiber wherein $A_{eff} \leq 60\ \mu m^2$.

Stimulated Raman Scattering (SRS)—an interaction between light and an optical fiber's molecular vibrations.

System Wavelength (λs)—the central wavelength of a single optical channel; or the average central wavelength of a group of optical channels that reside within the amplification band of an optical amplifier.

DETAILED DESCRIPTION

Manufacturers and installers of optical cable benefit when a single cable includes all of the different kinds of fiber needed in a particular transmission system. The present invention is for an optical cable that can be advantageously used in a Raman-pumped optical transmission system. Such pumping enables an optical fiber to provide a small amount of amplification, which is frequently enhanced by an auxiliary optical amplifier. By using both large and small-effective-area fibers, along with Raman amplification, longer transmission spans are possible before auxiliary amplifiers are needed. And when a single cable contains both large and small-effective-area fibers, inventory is reduced and installation is simplified. A brief discussion of fiber effective area and Raman amplification will enhance the reader's understanding.

Fiber Effective Area

As defined above, effective area is an optical attribute that is specified for singlemode optical fibers and defined as:

$$A_{eff} = 2\pi \left( \int_0^\infty E^2 r\, dr \right)^2 \bigg/ \left( \int_0^\infty E^4 r\, dr \right),$$

where E is the electric field associated with the propagated light. As a practical matter, effective area is related to the mode field diameter (MFD) of the fiber according to the mapping function, which is a formula by which the measured results of one attribute are used to predict the value of another attribute on a given fiber. For a given fiber type and design, the MFD can be used to predict the effective area with a mapping function that is specific to a particular fiber type and design. Mapping functions are generated by doing an experiment in which a sample of fiber is chosen to represent the spectrum of values of both MFD and for the fiber type and in which the fibers in the sample are measured for both MFD and $A_{eff}$. Linear regression can be used to determine the fitting coefficient, k, as defined by the following:

$$A_{eff} = k\pi \left( \frac{MFD}{2} \right)^2$$

Measurements of the effective area of a singlemode optical fiber is discussed in detail in FOTP-132, which is to be published as TIA/EIA-455-132-A, and which is hereby incorporated by reference.

Raman Amplifiers

It is well known that nonlinear interaction (NLI) between optical signals and the propagating medium (e.g., an optical fiber) can, in principle, be utilized for the amplification of signal radiation. It will be appreciated that optical fiber NLI amplifiers utilize an intrinsic property of the material of the fiber, and do not require the presence of a special dopant in the fiber, such as erbium. If one transmits multiple wavelengths on a single optical fiber, there are several nonlinear mechanisms that can transfer signal energy from one wavelength to another. SRS is a nonlinear parametric interaction between light and molecular vibrations. Light launched in an optical fiber is partially scattered and downshifted in frequency. The change in optical frequency corresponds to the molecular-vibration frequency. SRS is similar to stimulated Brillouin scattering (SBS), but can occur in either the forward or backward direction. The Raman gain coefficient is about three orders of magnitude smaller than the Brillouin gain coefficient, so in a single-channel system the SRS threshold is about three orders of magnitude larger than the SBS threshold. However the gain bandwidth for SRS, on the order of 12 THz or 120 nm, is much larger than that for SBS. A more detailed explanation of SRS is contained in an article entitled *Optical Fiber Transmission Systems Using Stimulated Raman Scattering: Theory*, by Kiyofumi Mochizuki, *Journal of Lightwave Technology*, Vol. LT-3, No. 3, June 1985.

FIG. 1 schematically depicts an optical transmission system 100 using SRS for amplification. Transmitter 10 generates optical transmission signals($\lambda_s$) in the 1550 nanometer (nm) wavelength region, for example, that propagate for many kilometers along optical fibers 11 and 12 before amplification is required. Raman amplification is accomplished by introducing an optical pump signal ($\lambda_p$) having a different wavelength than λs onto the transmission fiber 12 via wavelength-division multiplexer (WDM) 15. Note that the optical pump signal preferably travels in a direction that is opposite to the direction of signal propagation, and is therefore known as "reverse pumping." As discussed in application Ser. No. 08/683044, (Charplyvy 18-6-18) reverse pumping is preferred over forward pumping because it significantly reduces crosstalk attributable to pump-depletion modulation. Nevertheless, forward pumping of optical fiber 12 is also contemplated in an optical transmission system according to the present invention.

Amplification in the fiber via the Raman effect is possible when the wavelength separation between the optical pump signal $\lambda_p$ and the optical transmission signal $\lambda_s$ is judiciously selected. For fused silica fibers, significant Raman amplification is achieved over a relatively broad band of frequencies when sufficient pump power (at least 30 milliwatts) is applied. The amount of Raman gain achieved is directly proportional to the amount of pump power supplied to the fiber.

Figure 2:
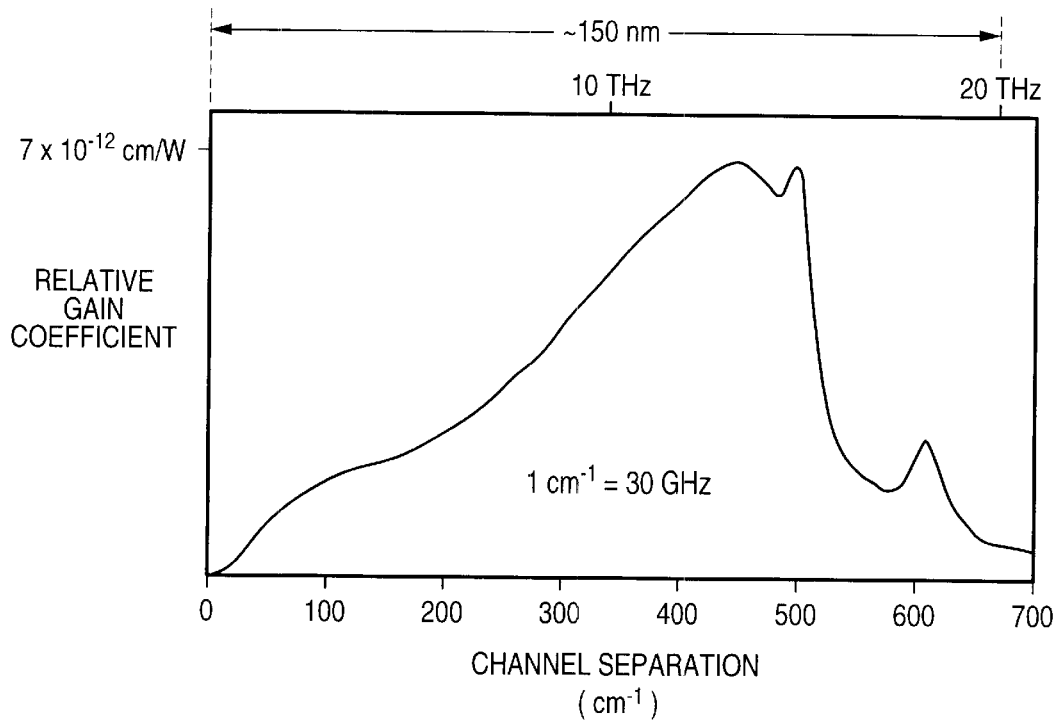
FIG. 2 is a graph showing the Raman gain coefficient for fused silica fibers as a function of the channel separation between pump and signal in THz as well as in the inverse centimeter ($cm^{-1}$) measure used by spectroscopists.

Reference is briefly made to FIG. 2, which is a graph showing the Raman gain coefficient for fused silica fibers as a function of the channel separation between pump and signal in THz as well as in the inverse centimeter (cm$^{-1}$) measure used by spectroscopists. The Raman gain coefficient shown in FIG. 2 applies to optical transmission wavelengths of about 1.55 $\mu$m and aligned single polarizations of pump and signal. For scrambled polarizations, the coefficient is reduced to about half the values shown. The peak of the gain curve is reached when the pump frequency is about 12 THz (400 cm$^{-1}$) lower than the transmission frequency. At the peak, the gain coefficient is about 7×10$^{-12}$ cm/W. Due to SRS, in an optical transmission system, signals at longer wavelengths are amplified by shorter-wavelength signals. SRS couples channels separated in wavelength by up to 140 nm, although there is a significant decrease beyond 120 nm. For optical transmission signals propagating in the 1.55 $\mu$m region, this means that any signal having a wavelength between 1430 nm and 1550 nm can transfer energy into the optical signal as indicated in FIG. 2.

In the preferred embodiment of the present invention, pump signals having wavelengths of 1429 nm, 1446 nm, 1470 nm and 1491 nm are simultaneously used to provide a broad, flat band of Raman amplification for wavelength-division multiplexed optical transmission signals. Each pump signal has a different power level and the cumulative power is about 600 milliwatts. Moreover, Raman amplifiers can be driven by multiple laser diodes to provide continuous service; if one laser diode stops working, then the others continue to provide power for amplification to the fiber.

In one direction, WDM 15 routes signals from a single input port onto multiple output ports according to wavelength and, in the other direction, routes signals of different wavelengths from multiple input ports onto a single output port. Accordingly, optical transmission signals $\lambda_S$ are routed from fiber 12 toward a receiver 20 and optical pump signals $\lambda_P$ are routed from Raman pump 16 onto fiber 12. In accordance with the present invention, optical fibers 11 and 12 are different from each other in that optical fiber 11 is selected to accommodate optical transmission signals having high intensity and optical fiber 12 is selected to enhance Raman amplification in an efficient manner.

Figure 3:
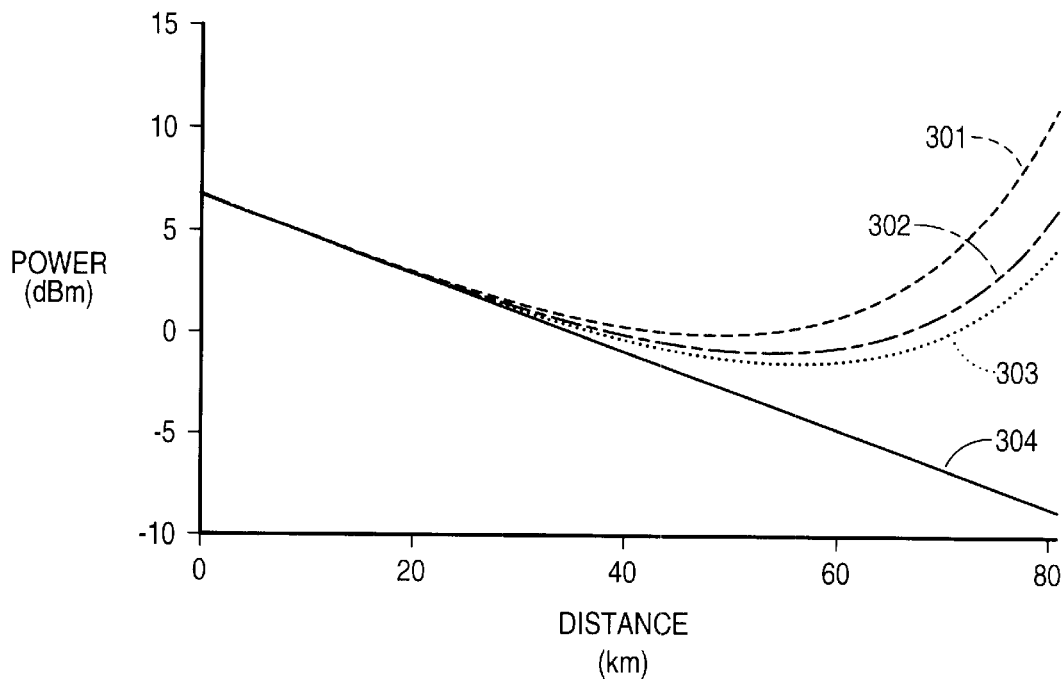
FIG. 3 is a graph showing optical power versus distance in an optical transmission system using Raman amplification for optical fibers having different effective areas.

Raman amplification is a nonlinear effect that is enhanced by increased power density. This means that for a given pump power, amplification is increased by decreasing the effective area of the optical fiber whose molecules are providing the amplification. This is clearly demonstrated in FIG. 3, which is a graph showing optical power versus distance in an optical transmission system using Raman amplification for optical fibers having different effective areas. Optical transmission signals are launched onto an optical fiber at distance "0 km" and Raman pumping is applied to the fiber at distance "80 km." Curves 301–304 show how optical transmission power decreases as a function of distance from the launch site. Curve 304 represents a system without Raman amplification, whereas curves 301–303 relate to systems where Raman pumping is applied. The amplification provided by such pumping varies inversely as a function of the effective area of the fiber. The smaller the effective area, the greater the amplification. Curve 301 represents an optical fiber where $A_{eff}$=55 $\mu$m$^2$; curve 302 represents an optical fiber where $A_{eff}$=72 $\mu$m$^2$; and curve 303 represents an optical fiber where $A_{eff}$=82 $\mu$m$^2$.

Figure 4:
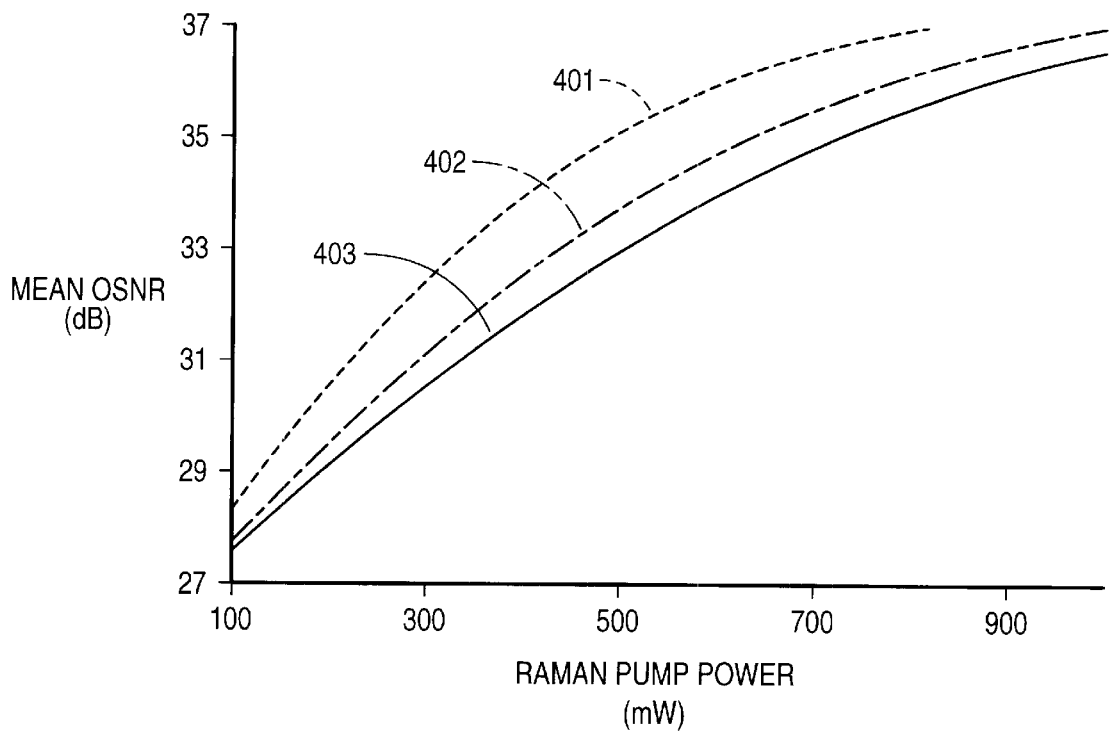
FIG. 4 is a graph showing optical signal-to-noise ratio in a Raman amplifier for optical fibers having different effective areas.

Advantageously, optical signal-to-noise ratio (OSNR) also varies inversely as a function of the effective area of the fiber. The smaller the effective area, the greater the OSNR as demonstrated in FIG. 4, which is a graph showing optical signal-to-noise ratio in a Raman amplifier for optical fibers having different effective areas. Curve 401 represents an optical fiber where $A_{eff}$=55 $\mu$m$^2$; curve 402 represents an optical fiber where $A_{eff}$=72 $\mu$m$^2$; and curve 403 represents an optical fiber where $A_{eff}$=82 $\mu$m$^2$. Accordingly, there are significant advantages to the use of small-effective-area optical fibers when Raman amplification is desired.

Figure 5:
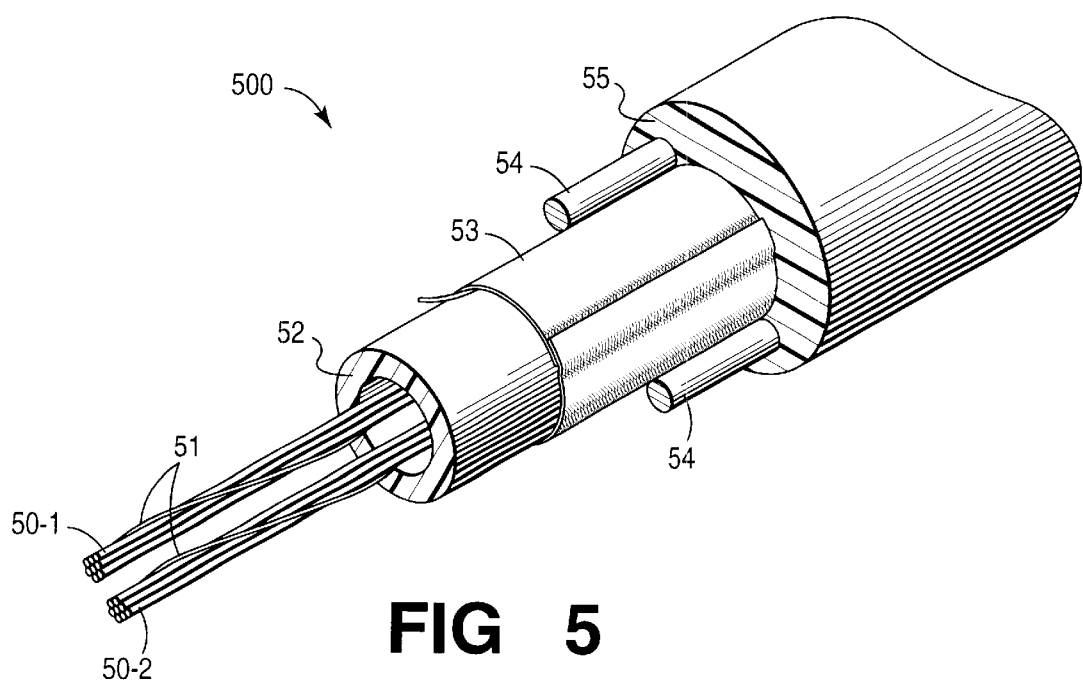
FIG. 5 is a perspective view of a cable containing optical fiber bundles having different effective areas in accordance with the invention.

By way of contrast, large-effective-area fibers allow greater signal power to be applied to the fiber before nonlinear effects are encountered. Increased signal power is obviously desirable because it enables optical signals to propagate farther before amplification is required. Clearly, both large and small-effective-area fibers are desirable in an optical transmission system where Raman amplification is to be used. In a preferred embodiment of the invention, both large and small-effective-area fibers are included in a single cable as shown in FIG. 5, which discloses a plurality of fiber bundles 50-1, 50-2 within a rugged optical cable structure 500. In this drawing, bundle 50-1 illustratively comprises a group of optical fibers having large effective areas, whereas bundle 50-2 illustratively comprises a group of optical fibers having small effective areas. Cable 500 may include bundles of various types within the present invention. What is important, however, is that the cable contains a plurality of fibers having large effective areas and a plurality of fibers having small effective areas.

FIG. 5 also provides greater detail regarding the construction of a practical cable according to the present invention. Optical cable 500 includes fiber bundles 50-1 and 50-2 that are held together as a unit by a yarn binder 51, which is typically color coded for identification purposes. These bundles are disposed within a tubular member 52 that is made, for example, from a plastic material such as polyvinyl chloride or polyethylene. Optionally, a gel-like filling material may be used to fill the interior region of the tubular member 52 to block the incursion of water and to cushion the fibers. Surrounding the tubular member 52 is a water-absorbing tape 53, and an outer jacket 55 comprising polyethylene material, for example, and encloses strength members 54. These strength members may be metallic or dielectric and serve to protect the optical fibers from tensile and/or compressive stresses that are applied to the cable during handling and normal service. Greater detail regarding the construction of cable 500 along with suitable filling materials are disclosed in U.S. Pat. No. 4,844,575. This same general cable construction may be used if the fiber bundles are replaced by ribbons such as shown in FIG. 6.

Figure 6:
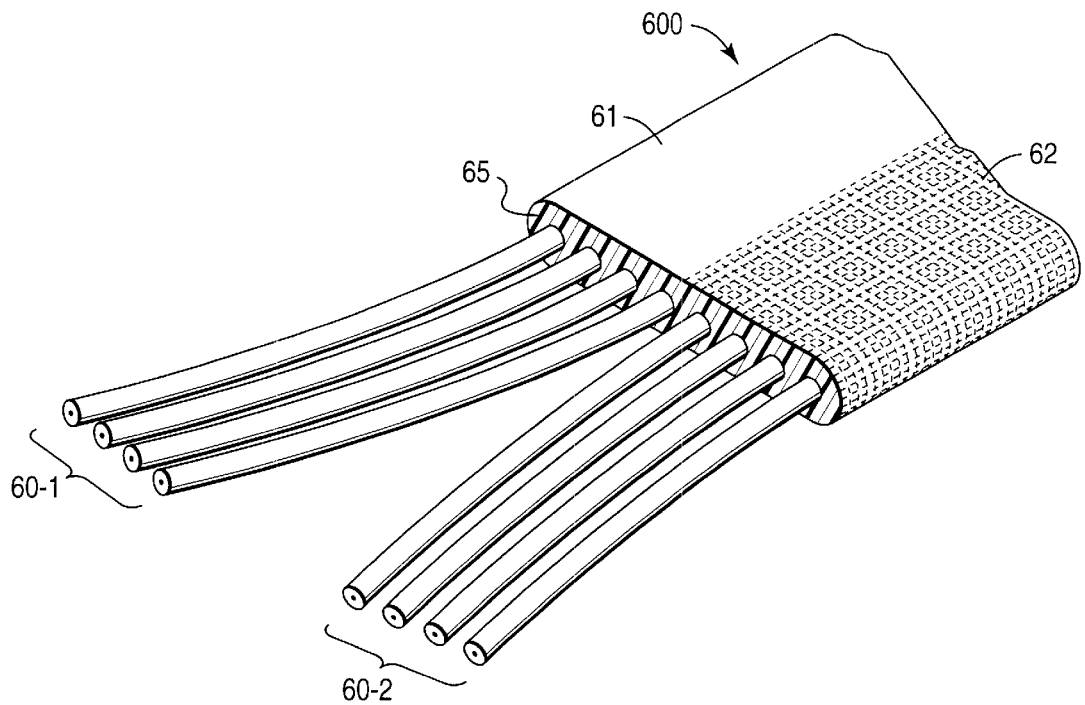
FIG. 6 is a perspective view of a cable containing a planar array of optical fibers having different effective areas in accordance with the invention.

FIG. 6 discloses a cable 600 comprising a planar array of optical fibers that are disposed in a matrix material. Such a cable is frequently referred to as a "ribbon." Here, eight optical fibers are shown divided into two groups: 60-1 and 60-2. Illustratively, group 60-1 comprises four optical fibers having a large effective area, and group 60-2 comprises four optical fibers having a small effective area. For ease of identification in the field, each individual optical fiber has a different color. Moreover, the ribbon 600 may include a marking to identify which fibers have positive dispersion and which have negative dispersion. Illustratively, light-colored portion 61 of ribbon 600 contains large-effective-area fibers whereas dark-colored portion 62 of ribbon 600 contains small-effective-area fibers. Although it is not necessary in the practice of the invention to have equal numbers of large and small-effective-area optical fibers within the same cable, it is preferable. Moreover, by manufacturing ribbons that have equal numbers of large and small-effective-area fibers, only one type of ribbon needs to be manufactured.

In the preferred embodiment of the invention, ribbon 600 comprises a parallel coplanar array of longitudinally extending optical fibers. Each optical fiber is enclosed in inner and outer layers of coating materials and is provided with a color identifier. A matrix bonding material 65 fills the interstices between the optical fibers and bonds them together into a single unit. Bonding material 65 has a modulus γ whose value is less than that of the outer coating layer on the fiber and more than the inner coating layer (i.e., $10^9$ Pa>γ≧$10^6$ Pa). This allows a degree of inter-fiber movement which is advantageous. Suitable bonding materials are disclosed in U.S. Pat. No. 4,900,126 which is hereby incorporated by reference.

Figure 7:
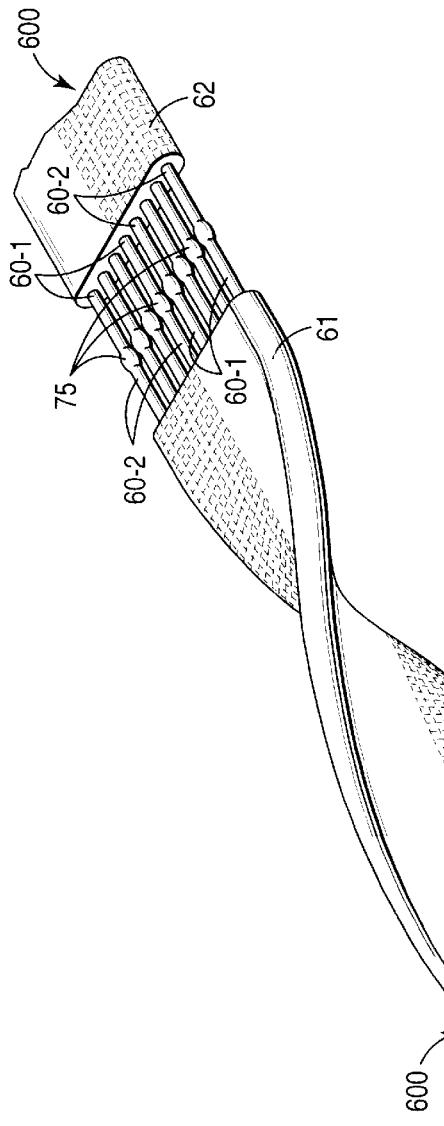
FIG. 7 illustrates an interconnection between optical cables of the kind shown in FIG. 6 via fusion splicing.

As discussed above, the use of large-effective-area fiber is desirable for the transmission of high power optical signals because power density, and consequent nonlinearities, are reduced. Conversely, small-effective-area fiber is desirable at the fiber location where Raman pumping is introduced because amplification is increased when power density of the pump energy is increased. These two apparently contradictory desires are resolved by using large-effective-area fiber where the signal energy is high; and small-effective-area fiber where the signal energy is low along with reverse Raman pumping. Accordingly, at some point (crossover) it is necessary to interconnect a large-effective-area fiber to a small-effective-area fiber. Such an interconnection is illustrated in FIG. 7, where large-effective-area fibers 60-1 are connected to small-effective-area fibers 60-2 via connection 75. Such a connection may be accomplished by any known fiber interconnection technique including, but not limited to, those described by Stephen C. Mettler et al. in "Optical Fiber Splicing," *Optical Fiber Telecommunications II,* (Stewart E. Miller et al. editors, 1988), pp. 263–300. Connecting the light-colored portion 61 of one ribbon 600 to the dark-colored portion 62 of another ribbon 600 is preferably made at the mid-point of a cable span.

Since optical transmission systems are generally bi-directional, it is generally advantageous to perform crossovers at the midpoint between amplifiers so that any non-linearity associated with excessive optical power density is equal in both directions. Moreover, since the interconnected fibers are preferably of opposite dispersion sign, cumulative dispersion can be reduced substantially to zero, provided that the positive dispersion provided by fiber 50-1 is substantially equal to the negative dispersion provided by fiber 50-2. Other factors influencing the crossover location include the magnitude, slope, and sign of the dispersion of the fibers as well as the power level of the pump and the optical signal.

Figure 8:
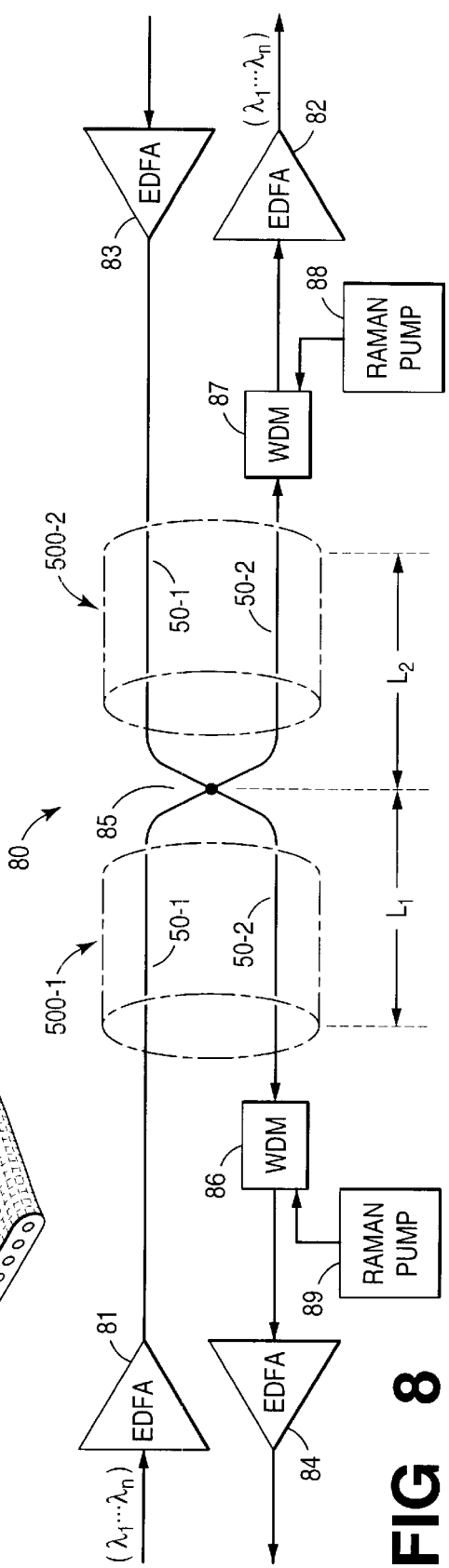
FIG. 8 discloses use of the optical cable shown in FIG. 5 in an optical transmission system having both erbium amplifiers and Raman amplifiers.

An example of a Raman-amplified optical transmission system 80 according to the present invention is shown in FIG. 8. In this example, the system 80 operates at 10 Gb/s in each direction and includes light sources, not shown, which generate a number of wavelength-division multiplexed channels, $\lambda_1 \ldots \lambda_n$, in the 1530–1565 nm wavelength range, each channel being separated by about 1.6 nm, and each channel operating at a speed of about 2.5 Gb/s. Amplifiers 81–84 are erbium-doped fiber amplifiers (EDFA) that provide effective amplification in the 1530–1565 nm range. The power level of the optical transmission signals at the output of these amplifiers is sufficiently high that it is desirable to use large-effective-area fibers. Accordingly, in the left-to-right direction the multiplexed channels are launched via amplifier 81 into a large-effective-area fiber 50-1 within cable 500-1, which extends for a length $L_1$. At this point the power levels of the multiplexed optical transmission signals, $\lambda_1 \ldots \lambda_n$, have decreased to a level whereby it is no longer necessary to use large-effective-area fibers. For singlemode fibers, an illustrative rate of power decrease is about 0.2 dB/km. A crossover splice 85 is then made, preferably at mid span, to a small-effective-area fiber 50-2 that extends for a length $L_2$. Cables 500-1 and 500-2 are identical to each other, and are shown in FIG. 5 containing both large and small-effective-area fibers. Advantageously, this cable can be severed at any convenient location for making splice connections.

Continuing in the left-to-right direction, wavelength-division multiplexer (WDM) 87 directs optical transmission signals $\lambda_1 \ldots \lambda_n$, into EDFA 82, and directs optical pump signals from Raman pump 88 into optical fiber 50-2 in the reverse transmission direction. It is understood that optical pump signals can be launched onto fiber 50-2 in any or both directions, and at any point along the length of fiber 50-2. Optical transmission system 80 operates similarly in the right-to-left direction, and optical fiber 50-2 within cable 500-1 is reverse pumped via Raman pump 89 and WDM 86 in the manner described above to provide amplification. It is understood that EDFAs 81–84 also require sources of optical pump energy (not shown), and that although not necessary in the present invention, the EDFAs advantageously work together with the amplification provided by stimulated Raman scattering in fiber 50-2. Illustrative specification for fibers 50-1 and 50-2 are shown below:

Large-effective-area fiber specifications:

| | |
|---|---|
| Attenuation at 1550 nm | 0.17 dB/km |
| Mode field diameter at 1550 nm | 11.8 microns (μm) |
| Cladding diameter | 125 ± 1.0 μm |
| Cutoff wavelength | <1450 nm (2m reference length) |
| Dispersion at 1550 nm | 21.5 ps/nm · km |
| Relative dispersion slope | 0.0030 $nm^{-1}$ |
| Effective Area | 110 $\mu m^2$ |
| Coating diameter | 245 ± 10 microns |
| Proof test | 100 kpsi |

Small-effective-area fiber specifications:

| | |
|---|---|
| Attenuation at 1550 nm | 0.23 dB/km |
| Mode field diameter at 1550 nm | 6.9 microns (μm) |
| Cladding diameter | 125 ± 1.0 μm |
| Cutoff wavelength | <1450 nm (2m reference length) |
| Dispersion at 1550 nm | −17.7 ps/nm · km |
| Relative dispersion slope | 0.0033 $nm^{-1}$ |
| Effective Area | 35 $\mu m^2$ |
| Coating diameter | 245 ± 10 microns |
| Proof test | 100 kpsi |

And while the above-described fibers are preferred in connection with a Raman-amplified optical transmission system, numerous other fibers are commercially available from Lucent Technologies and Corning, Inc., for example, that have different effective areas, different dispersion signs, and different dispersion slopes that are suitable for use in the present invention. Indeed, the practitioner of this art may readily select any combination of large and small-effective-area fibers to satisfy various system design considerations within the scope of the present invention. Although various particular embodiments of the present invention have been shown and described, modifications are possible within the scope of the invention. These modifications include, but are not limited to: the use of the present invention in a system whose source wavelength ($\lambda_s$) is outside the 1530–1565 nm wavelength region; making crossover connections at locations other than mid span (i.e., $L_1 \neq L_2$); cables having a different number of large-effective-area fibers than small-effective-area fibers; cables having fibers with different magnitudes of large and small effective areas at the source wavelength; cables having fibers in addition to large and small-effective-area fibers; and cables having different constructions than the ones illustrated—e.g., optical cables without tubular members or strength members.

What is claimed is:

1. A Raman-amplified optical transmission system comprising:
   a transmitter that generates optical transmission signals having a system wavelength $\lambda_s$, said optical signals being connected to a first optical fiber, of length $L_1$, having a first effective area;
   a second optical fiber, of length $L_2$, connected to the first optical fiber, said second optical fiber having a second effective area, which is substantially less than the first effective area;
   a source of optical pumping energy coupled onto the second optical fiber, said source having a power level and a wavelength $\lambda_P$ that are suitable for enabling the second optical fiber to provide Raman amplification of optical signals at the $\lambda_s$ wavelength; and
   a receiver that receives optical signals at the system wavelength $\lambda_s$.

2. The optical transmission system of claim 1 wherein $\lambda_s$ resides in the wavelength range 1530 nm–1565 nm.

3. The optical transmission system of claim 1 wherein the first optical fiber has an effective area $A_{eff} \geq 70\ \mu m^2$ and wherein the second optical fiber has an effective area $A_{eff} \leq 60\ \mu m^2$.

4. The optical transmission system of claim 1 wherein the first optical fiber has a positive dispersion at 1550 nm and the second optical fiber has a negative dispersion at 1550 nm.

5. The optical transmission system of claim 1 wherein the first optical fiber resides in a cable containing optical fibers having effective areas $A_{eff} \geq 70\ \mu m^2$, and wherein the second optical fiber resides in a cable containing optical fibers having effective areas $A_{eff} \leq 60\ \mu m^2$.

6. The optical transmission system of claim 1 wherein the first optical fiber resides within a cable containing one or more optical fibers having effective areas $A_{eff} \leq 60\ \mu m^2$, and wherein the second optical fiber resides in a cable containing one or more optical fibers having effective areas $A_{eff} \geq 70\ \mu m^2$.

7. The optical transmission system of claim 6 wherein the cables contain equal numbers of optical fibers having effective areas $A_{eff} \leq 60\ \mu m^2$ and optical fibers having effective areas $A_{eff} \geq 70\ \mu m^2$.

8. The optical transmission system of claim 1 wherein the first optical fiber is bonded together with other optical fibers having approximately equal effective areas in a planar array, said optical fibers having longitudinal axes that are substantially parallel to one another.

9. The optical transmission system of claim 1 wherein the first optical fiber resides within a plastic tubular member that encloses other optical fibers having approximately equal effective areas, said tubular member being disposed within a cable that includes a plastic outer jacket and one or more strength members that extend along the length of the cable.

10. The optical transmission system of claim 1 wherein the optical pumping energy propagates along the second optical fiber in a direction, which is opposite the direction of the optical transmission signals.

11. The optical transmission system of claim 1 wherein $L_1$ is approximately equal to $L_2$.

12. The optical transmission system of claim 1 further including one or more erbium-doped fiber amplifiers connected to the first and/or second optical fibers.

13. A Raman-amplified optical transmission system comprising:
    a source of optical signals having a system wavelength $\lambda_s$, said optical signals being connected to a first optical fiber, of length $L_1$, having a large effective area, i.e., $A_{eff} \geq 70\ \mu m^2$, said first optical fiber residing in a cable containing one or more optical fibers having a small effective area, i.e., $A_{eff} \leq 60\ \mu m^2$;
    a second optical fiber, of length $L_2$, connected to the first optical fiber, said second optical fiber having a small effective area and residing in a cable containing one or more optical fibers having a large effective area; and
    apparatus for coupling a source of optical energy, having a nominal wavelength $\lambda_P$, onto the second optical fiber for enabling it to provide Raman amplification of optical signals at the $\lambda_s$ wavelength.

14. The optical transmission system of claim 13 wherein $\lambda_s$ resides in the wavelength range 1530 nm–1565 nm.

15. The optical transmission system of claim 13 wherein the first optical fiber has a positive dispersion at 1550 nm and the second type of optical fiber has a negative dispersion at 1550 nm.

16. The optical transmission system of claim 13 wherein $L_1$ is approximately equal to $L_2$.

17. The optical transmission system of claim 13 further including one or more erbium-doped fiber amplifiers connected to the first and/or second optical fibers.

* * * * *